May 12, 1959  L. J. BRANCATO  2,886,088
NUT HAVING RADIALLY ADJUSTABLE COIL INSERT
Filed June 30, 1955
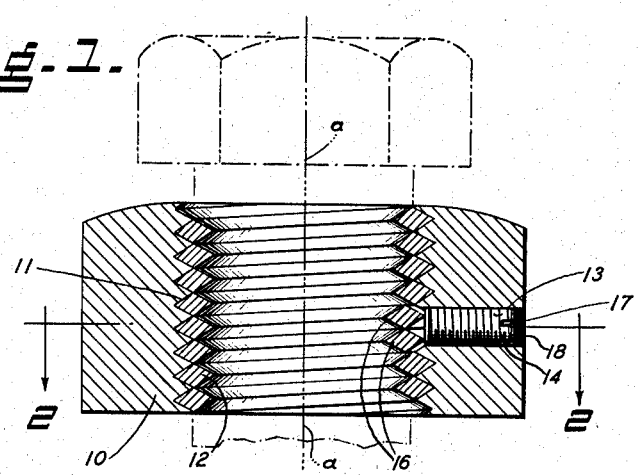
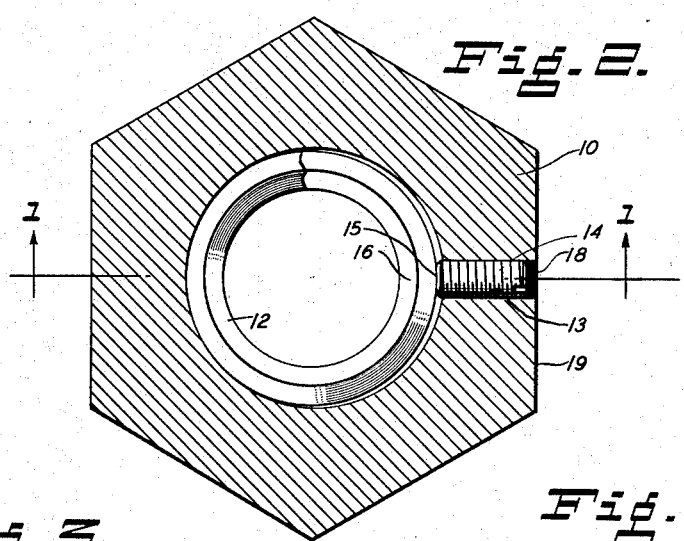
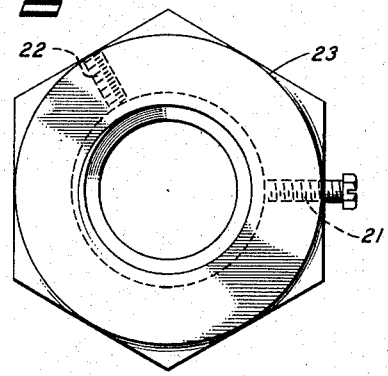
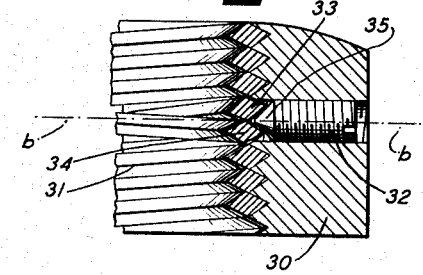
INVENTOR.
LEO J. BRANCATO
BY
ATTORNEY

United States Patent Office 2,886,088
Patented May 12, 1959

2,886,088

NUT HAVING RADIALLY ADJUSTABLE COIL INSERT

Leo J. Brancato, Danbury, Conn., assignor to Heli-Coil Corporation, Danbury, Conn., a corporation of Delaware Application June 30, 1955, Serial No. 519,203

1 Claim. (Cl. 151—22)

The invention relates to a nut with adjustable torque characteristic. In many applications of nuts it is required that the nut can be turned on or off a screw bolt by a prescribed torque. Nuts of that type are commonly denoted as "prevailing torque nuts." They are characterized by a torque effect produced by a prior working or setting of the nut. Generally this is attained by providing the nut with a certain fit on the bolt for which it is destined. However, in volume production of nuts and screws it is practically impossible to attain a desired torque within narrow tolerances by applying just any one of the so produced nuts to any one of the bolts because the tolerances allowed for the dimensions of the threads of the nuts and bolts may add, in the one instance, to a looser fit and, in another instance, to a tighter fit. In other uses of nuts it is desirable that the nut is free spinning while being screwed on a bolt but is locked after the screw connection is firmly established, in other words, that a high torque is necessary to loosen the nut after it has been tightened. Means frequently used for such purpose in conventional nuts, as e.g. set screws, tend to damage the threads of the bolt, particularly if it is required that a certain torque must be applied during the whole unscrewing operation.

The invention aims, therefore, to provide a prevailing torque nut which is adjustable as to the torque to screw the nut on and off a bolt of suitable thread dimension and wherein the torque characteristic can be varied between a minimum, in which event, the nut is free spinning, and a maximum, in which event, the nut is practically immovable.

Another object of the invention is the provision of a nut of the mentioned type which will not damage the thread of the bolt regardless of the rate of the adjusted torque characteristic.

The invention also contemplates the provision of means whereby the torque for applying the nut may be adjusted as required or desired and, then, rendered unchangeable.

Further objects and details of the invention will be apparent from the description given hereinafter and the accompanying drawing illustrating an embodiment thereof by way of example.

In the drawing:

Fig. 1 is a cross-section along line 1—1 of Fig. 2 of a nut according to the invention, Fig. 2 is a cross-section of the nut according to line 2—2 of Fig. 1, Fig. 3 is a top plan view of a modification, and Fig. 4 is a partial cross-section of another modification.

Referring now to the drawing, the nut comprises a barrel 10 of any desired peripheral shape, which in the illustrated embodiment, is hexagonal. The barrel 10 is provided with an inner screw thread 11 into which a screw thread forming wire coil 12 is inserted. The cross-section of the wire of the insert may be of any suitable form, e.g., of diamond shape as shown, so as to fit the thread 11 and to form, with its inner portion, a screw thread to receive therein a screw bolt, shown in dash-lines. However, it is also possible to use a barrel with a merely cylindrical hole against the wall of which the insert bears frictionally owing to its resiliency, or other types of barrels as e.g., shown in U.S. Patents 2,407,-879 and 2,386,197. At right angles to the axis a—a of the nut, a tapped bore 13 is provided into which a set screw 14 is screwed. The set screw preferably has a plain end face 15 with which it can bear on the outside of at least one convolution 16. In order to ensure proper engagement of the set screw and at least one coil convolution, it is advisable to make the diameter of the set screw larger than one pitch of the coil convolution. Now it will be clear that by screwing the set screw inward, at least one convolution 16 of the coil 12 will be urged locally inward so as to cause a tighter engagement between such convolution and the bolt than between the latter and the other convolutions of the coil. In consequence, in order to apply the nut to a bolt or to remove it therefrom, a torque will be necessary which is the higher the deeper the set screw is screwed in. Since, the set screw does not engage the thread of the bolt but only urges the convolution 16 inward against the bolt, the thread of the latter will not be damaged.

The set screw in the structure according to the invention has the further effect that owing to the friction caused thereby a locking action between the barrel and the coil will be created to prevent or at least render more difficult the removal of the coil from the barrel in response to a torque.

The set screw can be adjusted at any time, that means, before the nut is applied to the bolt, before the nut has been tightened or after it has been tightened. In the last mentioned case, the set screw can be so adjusted that a torque applied to remove the nut will rather break the bolt than loosen the nut.

When the set screw urges a convolution 16 inward, the resiliency of the convolution will have a certain locking effect, so that in most instances the set screw will not change its position in the nut even if the latter is subjected to vibrations. However, additional means may be applied positively to insure immovability of the set screw, that means, to render the torque characteristic unchangeable once it has been properly adjusted. For instance, if the set screw is shorter than the thickness of the nut wall and provided with a slot 17 for the application of a screw driver, the space 18 between the slotted end of the set screw and the outer surface 19 of the nut barrel 10 may be filled with a suitable material, such as a sealing wax or a solder. On the other hand, when the set screw is originally longer so as to project with its head end from the barrel surface while its foot end bears on a convolution 16, the projecting portion may be cut off flush with the surface 19 after the torque has been adjusted.

Furthermore, rather than only one set screw, there may be several such screws angularly or axially spaced from one another in order to minimize the local contact pressure with the bolt thread. Fig. 3 shows a nut similar to that of Figs. 1 and 2 in which, however, two set screws 20 and 21 are provided in the barrel 23. The set screws 20 and 21 originally project from the barrel as shown with respect to the screw 21. When the adjustment of the screws is accomplished, the set screws can be cut or milled off as shown with respect to screw 22.

Whereas in the embodiment illustrated in Fig. 1, the set screw bears with a flat surface against the outer crest of at least one coil convolution, it is also possible to apply a pointed set screw as shown in Fig. 4. In this figure, the nut barrel 30 is lined by the coil 31. The set screw 32 is so located that its axis b—b passes between two convolutions 33 and 34. The set screw has a point 35 and enters between the outer portions of the convolutions 33 and 34 so as to urge them locally out of their normal positions. The effect of this set screw is similar to that of the set screw 14, particularly if the angle of the set screw point 35 complements the angle between the outer portions of the convolutions 33 and 34. However, it is preferable to make the point angle larger than the angle between those outer portions. For instance, the angle of the point 35 may be 90° if the angle between the convolutions is 60°. This will cause not only a shift of the engaged portions of the convolutions in a direction having an axial and a radial component but will simultaneously tend to twist the portions of the convolutions whereby the friction between the coil and an engaging bolt and thus the torque for screwing the bolt in or out, will be still more increased.

It has been stated hereinbefore that the set screw causes a locking action of the coil to the barrel. In the case of the form of the set screw last described this action is particularly increased owing to the mentioned axial component which will urge the engaged convolutions firmly against the adjacent flanks of the thread groove of the barrel.

The nut according to the invention having adjustable torque characteristics, can be used with essentially the same design as a highly effective all metal lock nut which is suitable even for high temperature applications. Owing to the fact that the locking effect can be obtained without sacrificing effectiveness of the load carrying threads, the nut can be designed with no greater height than a standard nut.

It will be apparent to those skilled in the art that alterations and modifications of the structure illustrated and described may be made without departure from the spirit and essence of the invention which for that reason shall not be limited but by the scope of the appended claim.

I claim:

An all metal prevailing torque nut comprising a nut barrel provided with an inner uniform screw thread groove of V-cross-section, a resilient cylindrical wire coil, the wire being diamond-shaped in cross-section and having an inner screw thread forming portion and an outer screw thread forming portion which substantially complements the groove of the barrel thread, said wire coil being inserted in said barrel so that said outer screw thread forming portion, substantially throughout its extension, uniformly engages in the thread groove of said barrel and bears against the flanks of said groove, said barrel being provided with a tapped hole through its wall intermediate its ends and at right angles to the axis of said wire coil, and a set screw engaging the thread of said hole and bearing with its inner end on the outside of at least one convolution of said coil and adapted to be adjusted so as to urge said outer wire coil portion at the pressure point of said set screw and in the neighborhood thereof out of contact with the flanks of said thread groove of said barrel, whereby said coil convolution at and near said pressure point is adapted to provide a substantially floating bolt lock of adjustable torque characteristic.

References Cited in the file of this patent

UNITED STATES PATENTS

| | | |
|---|---|---|
| 230,009 | Harding | July 13, 1880 |
| 1,145,256 | Mochow et al. | July 6, 1915 |
| 1,156,105 | Sleeper | Oct. 12, 1915 |
| 2,262,450 | Caminez | Nov. 11, 1941 |
| 2,363,663 | Findley | Nov. 28, 1944 |
| 2,402,159 | Hattan | June 18, 1946 |
| 2,688,355 | Forster | Sept. 7, 1954 |
| 2,745,457 | Lang | May 15, 1956 |

FOREIGN PATENTS

| | | |
|---|---|---|
| 240,775 | Great Britain | Oct. 8, 1925 |